United States Patent
Jamieson et al.

(10) Patent No.: US 6,972,498 B2
(45) Date of Patent: Dec. 6, 2005

(54) VARIABLE DIAMETER WIND TURBINE ROTOR BLADES

(75) Inventors: Peter McKeich Jamieson, Glasgow (GB); Chris Hornzee-Jones, Brighton (GB); Emilian M. Moroz, Tehachapi, CA (US); Ralph W. Blakemore, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 10/157,337

(22) Filed: May 28, 2002

(65) Prior Publication Data

US 2003/0230898 A1 Dec. 18, 2003

(51) Int. Cl.⁷ .................. F03B 15/06; B64C 11/00; B63H 1/22; F03D 9/00; H02P 9/04
(52) U.S. Cl. .................. 290/55; 290/44; 415/2.1; 415/4.5; 416/1; 416/87; 416/89
(58) Field of Search .................. 290/44, 55, 43; 416/139, 197, 1, 87, 89; 415/95, 7, 2.1, 4.2, 415/57.2, 4.5; 60/641.12, 641.7

(56) References Cited

U.S. PATENT DOCUMENTS

| | | | | |
|---|---|---|---|---|
| 2,074,149 A | * | 3/1937 | Jacobs | 416/88 |
| 3,768,923 A | * | 10/1973 | Fradenburgh | 416/89 |
| 4,641,039 A | * | 2/1987 | Carre | 290/44 |
| 4,653,982 A | * | 3/1987 | Kojima et al. | 416/44 |
| 4,692,095 A | * | 9/1987 | Lawson-Tancred | 416/23 |
| 4,710,101 A | * | 12/1987 | Jamieson | 416/32 |
| 5,630,705 A | | 5/1997 | Eikelenboom | |
| 6,612,810 B1 | * | 9/2003 | Olsen et al. | 416/95 |
| 6,726,439 B2 | * | 4/2004 | Mikhail et al. | 415/4.1 |
| 2003/0123973 A1 | * | 7/2003 | Murakami | 415/4.1 |
| 2003/0138315 A1 | * | 7/2003 | Brueckner | 415/4.5 |
| 2003/0223868 A1 | * | 12/2003 | Dawson et al. | 416/1 |

FOREIGN PATENT DOCUMENTS

| | | |
|---|---|---|
| DE | 004428731 A1 * | 2/1996 |
| DE | 019929386 A1 * | 6/2000 |
| EP | 1 327 773 A2 | 7/2003 |
| JP | 59-20871 B | 5/1984 |
| JP | 59-160866 | 10/1984 |
| JP | 2001-132615 A | 5/2001 |
| WO | WO 02/077449 A1 | 10/2002 |
| WO | WO 03/036082 | 5/2003 |

OTHER PUBLICATIONS

PCT Search Report for international application No. PCT/JP01/02425 (1 page and English translation).
PCT Search Report for international application No. PCT/US 03/23748 (14pages).

* cited by examiner

*Primary Examiner*—Nicholas Ponomarenko
*Assistant Examiner*—Julio C. Gonzalez
(74) *Attorney, Agent, or Firm*—Blakely, Sokoloff, Taylor & Zafman LLP

(57) ABSTRACT

A system and method for changing wind turbine rotor diameters to meet changing wind speeds and control system loads is disclosed. The rotor blades on the wind turbine are able to adjust length by extensions nested within or containing the base blade. The blades can have more than one extension in a variety of configurations. A cable winching system, a hydraulic system, a pneumatic system, inflatable or elastic extensions, and a spring-loaded jack knife deployment are some of the methods of adjustment. The extension is also protected from lightning by a grounding system.

26 Claims, 9 Drawing Sheets

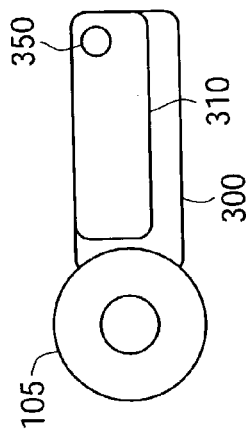
FIG. 3n
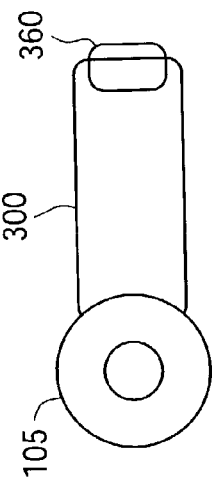
FIG. 3p
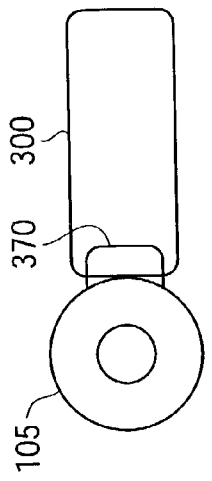
FIG. 3r
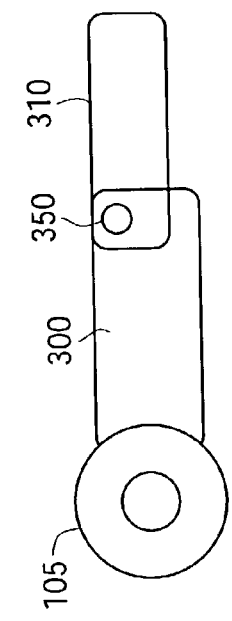
FIG. 3m
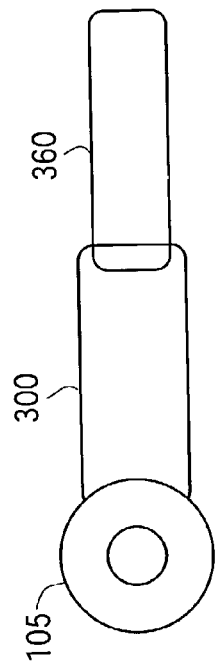
FIG. 3o
FIG. 3q

VARIABLE DIAMETER WIND TURBINE ROTOR BLADES

GOVERNMENT INTEREST

This Invention was made with Government support under NREL Subcontract No. ZAM-7-13320-26, Prime Contract DE-AC36-83CHI0093, DOE Case No. S-104,777 awarded by the Department of Energy. The Government has certain rights in this invention.

FIELD OF THE INVENTION

The field of the invention relates to wind turbines. More specifically, the invention relates to the use of a variable diameter rotor for wind turbines.

BACKGROUND OF THE INVENTION

Wind power is one of the cleanest and most environmentally friendly methods of producing electrical energy currently available. Wind power can produce major amounts of electrical energy without the production of carbon dioxide and other greenhouse gases. Additionally, wind power is renewable, as opposed to traditional fossil fuel sources of energy.

Modern wind turbines are placed on towers to take advantage of strong winds found higher up in the atmosphere, above the clutter of buildings and trees. Traditionally, rotors are attached by a hub to a low speed shaft leading into a nacelle. Inside the nacelle, a gearbox takes the high torque and low speed of the low speed shaft and converts it to the low torque and high speed of the high-speed shaft. The high-speed shaft drives a generator to produce electrical energy.

The amount of electrical energy generated is based in part on the size of the rotors used by the wind turbine and its relationship to the size of electrical generator. A general rule is that wind energy is proportional to the square of the diameter of the rotor. A second factor that contributes to the amount of electrical energy is the speed of the winds acting upon the rotor. If a large rotor relative to the size of the generator is suddenly acted upon by high winds, it can produce more electricity than the generator can absorb and additionally over stress the structure. Conversely, in a time of low winds, if the rotor is not large enough for the generator, the wind turbine efficiency may be low and the structure will see only a small proportion of its load carrying potential. What is needed is a wind turbine that can adjust to handle varying wind speed conditions in an efficient manner, while attempting to maximize energy capture for a given support structure.

SUMMARY OF THE INVENTION

A system and method for adjusting the diameter of a rotor in a wind turbine is described. In one embodiment, a wind turbine rotor is described that comprises a center hub, a first set of aerofoil rotor blades arranged around the center hub, and a first set of aerofoil rotor blade extensions nested inside the first set of aerofoil rotor blades. The first set of extensions are capable of extending an amount less than or equal to the length of the first set of blades by protracting from the first set of blades.

BRIEF DESCRIPTION OF THE DRAWINGS

The present invention is illustrated by way of example and not limitation in the figures of the accompanying drawings, in which.

DETAILED DESCRIPTION

A variable diameter rotor for a wind turbine generator is disclosed. In the following detailed description, numerous specific details are set forth in order to provide a thorough understanding of the present invention. However, it will be apparent to one of ordinary skill in the art that these specific details need not be used to practice the present invention. Well-known structures, materials, circuits, processes and interfaces have not been shown or described in detail in order not to unnecessarily obscure the present invention.

The variable diameter rotor includes base blades and one or more blade extensions associated with the base blades. The blade extensions move between positions that range from fully extended to fully retracted. In embodiments where blades have more than one blade extension, the blade extensions for a blade may be independent from each other in that various blade extensions for a blade may be more extended or retracted than the other blade extensions for that blade.

In one embodiment, the extension and retraction of rotor blades to increase or decrease rotor diameter, respectively, is based on wind conditions and blade pitch angle. For example, in low winds, the rotor may be fully extended. As the winds increase in speed, the blades may start to pitch and a portion of the rotor blades may be retracted. In high winds, the rotor blades may be fully retracted. Thus, the diameter of the rotor may be increased to increase energy capture in frequently occurring moderate wind speeds (e.g., below rated wind speed) where most of the energy is available. At the same time, the rotor diameter may be reduced in high winds that would cause loads that would otherwise penalize a rotor of relatively large diameter.

Figure 1:
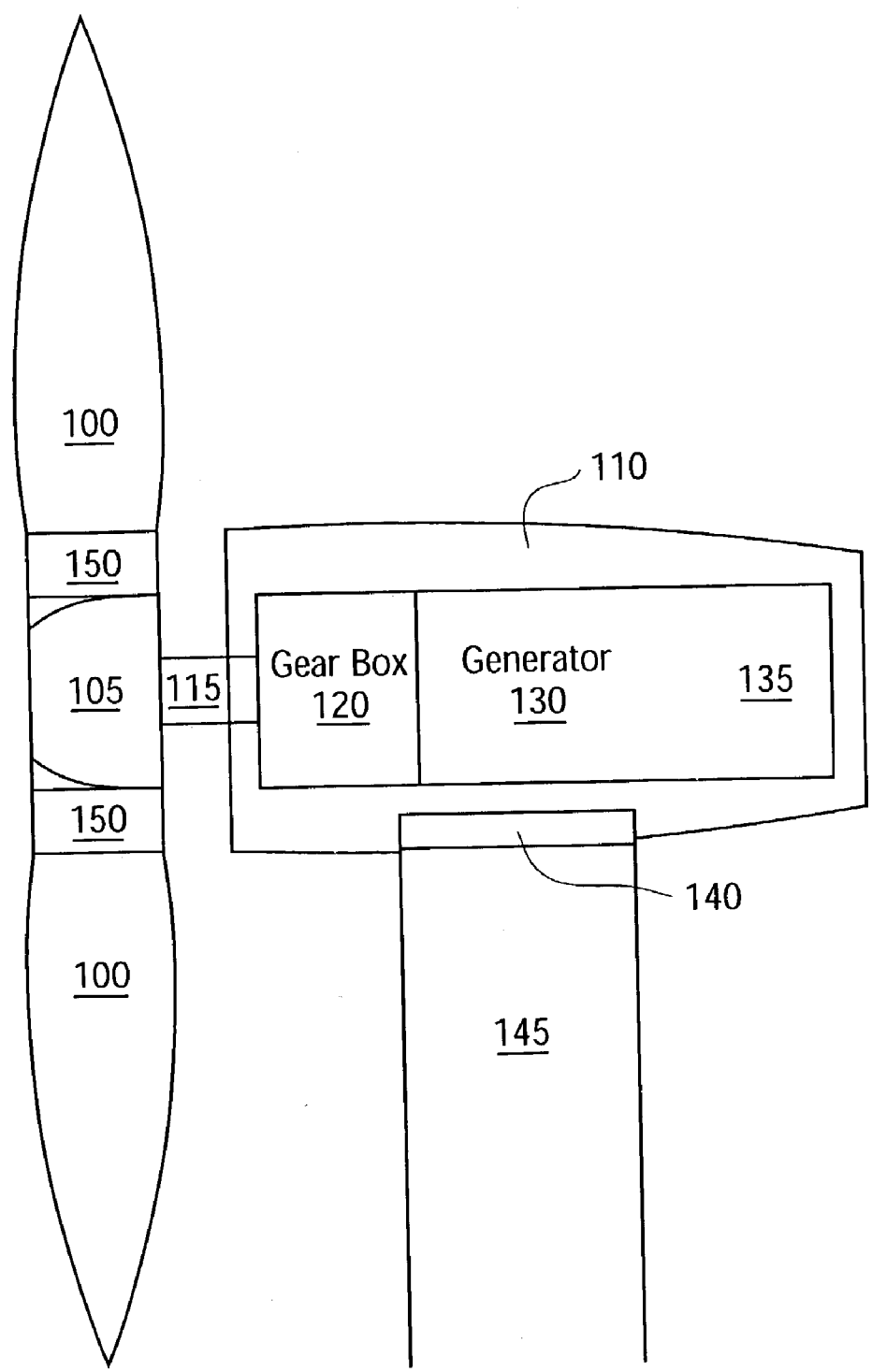
FIG. 1 illustrates a standard wind turbine power generating system.

FIG. 1 illustrates one embodiment of a wind turbine. Referring to FIG. 1, rotor blades 100 are coupled to rotor hub 105. Rotor blades 100 and rotor hub 105 form the wind turbine rotor, which is a variable diameter rotor with one or more blade extensions.

In one embodiment, rotor blades 100 include aerofoils that nest telescopically within blade sections of greater dimension also using aerofoils, thereby preserving greater rotor efficiency. That is, the rotor blades comprise sections that have the ability to nest a narrow, constant chord or tapered aerofoil section inside a wide airfoil section.

Hub 105 is attached to a nacelle 110 by the shaft 115. The rotation of shaft 115 is coupled to a gearbox 120.

An electrical control system 135 monitors the conditions of the wind turbine, making appropriate adjustments as necessary. The electronic control system 135 controls a yaw mechanism 140, which controls the direction of the turbine upon tower 145. In addition to yaw control, the electronic control system 135 also controls the pitch mechanism 150, which control the pitch angle of the rotor blades 100, the rotational speed of the shaft 115 and the extension of the rotor blades 100.

In one embodiment, the diameter of the rotor is adjusted by extending or retracting the blade extensions. In one embodiment, the extension or retraction of blade extensions is performed based on wind speed. The change of rotor diameter compensates for differences in wind speed and turbulence, with a goal being to convert as much wind energy to electrical energy as possible in an efficient manner, while keeping loads within prescribed levels.

Figure 2C:
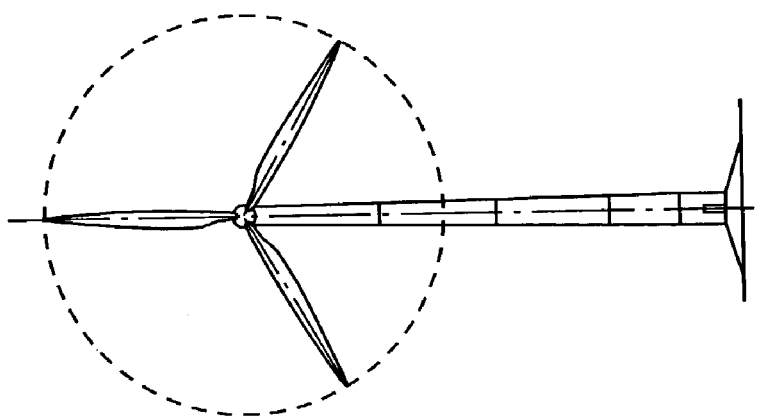
FIGS. 2a–2c illustrates one embodiment of a wind turbine with adjustable rotor blades that can extend to operate at various diameters.
Figure 2B:
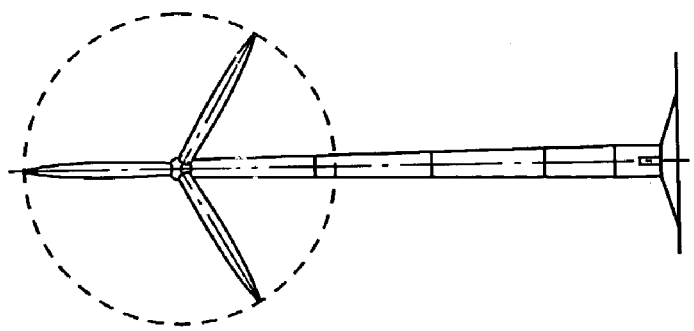
Figure 2A:
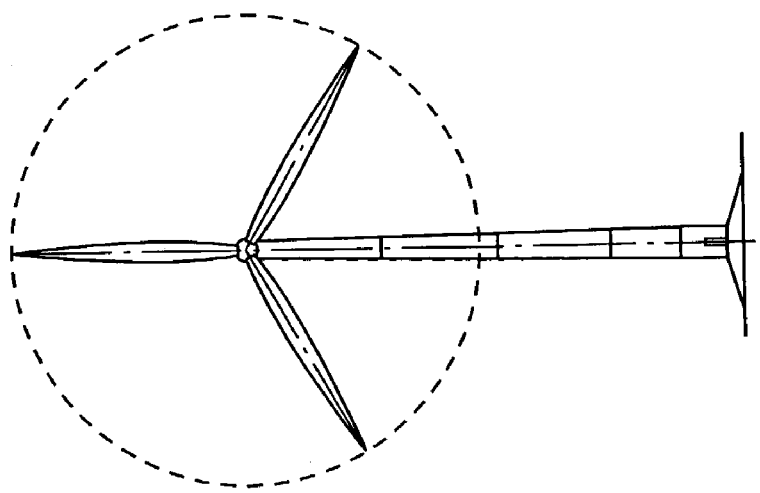

FIGS. 2a–c illustrate the variable diameter rotor in three positions: fully extended, fully retracted, and a position between fully extended and fully retracted. FIG. 2a shows the rotor with rotor blades fully extended. This position may be helpful in capturing energy from low velocity winds. FIG. 2b shows the rotor with the rotor blade extensions fully retracted. This position may be used when the wind turbine is capturing energy from high velocity winds and trying to avoid accumulating excessive fatigue loads and large extreme loads. FIG. 2c shows the rotor with rotor blade extensions only partially extended. This position may be useful for moderate wind conditions. The blade extensions can be extended based on the wind speed measured from an anemometer or by the power produced by the generator.

In one embodiment, the variable diameter rotor may operate with a larger diameter and higher rating than a baseline fixed diameter turbine and the load is regulated using the pitch system. In one embodiment, a torque factor greater than a conventional baseline turbine (e.g., 1.5 times baseline torque) is used whenever the rotor diameter is at its maximum and a minimum pitch angle (e.g., 1°) is used for maximum energy capture. Whenever the blade extensions are not fully extended or whenever a command to retract is received, the minimum pitch angle is immediately set to another predetermined value (e.g., 8°) greater than that used when the rotor diameter is at its maximum. This helps to reduce, and potentially minimize, loads on the system.

Figure 3B:
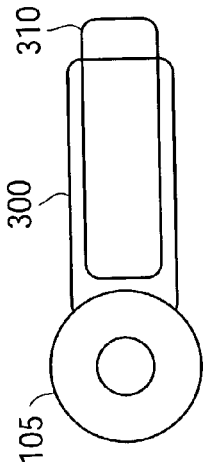
FIGS. 3a–3r illustrates different methods of varying the length a rotor blade and consequently the diameter of the rotor blades.
Figure 3D:
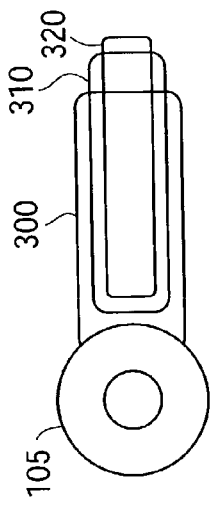
Figure 3F:
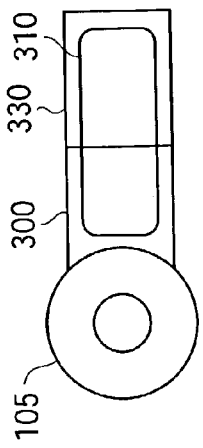
Figure 3A:
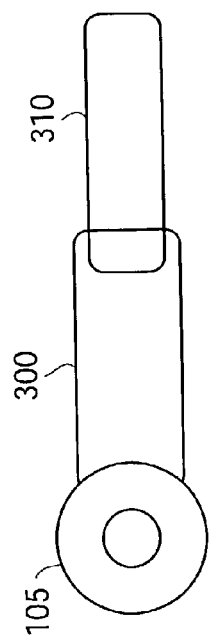

There are a number of different techniques for adjusting the rotor diameter. A number of such techniques are shown in FIGS. 3a–3r. FIG. 3a shows a base blade 300 with a blade extension 310, in which the base blade 300 is attached to the central hub 105. FIG. 3b shows the same base blade 300 with the extension 310 fully retracted. Blade extension 310 is nested in base blade 300, and is capable of being extended or retracted along a track or other guidance mechanism. In one embodiment, the base blade comprises a glass/epoxy blade, and the blade extension may be carbon epoxy. Alternatively, other lightweight compounds may be used.

Figure 3C:
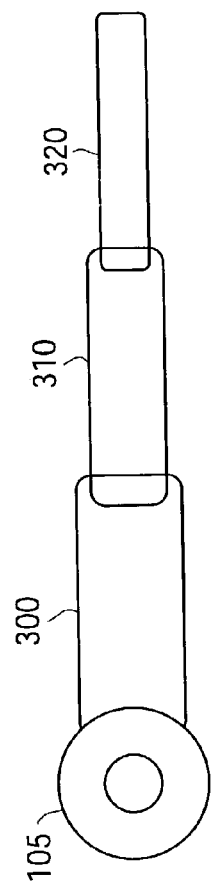

FIG. 3c shows an embodiment in which a second blade extension 320 is added to blade extension 310, with all blade extensions being fully extended. FIG. 3d shows the same double extension rotor blade having its blade extensions 310 and 320 being fully retracted (blade extension 320 nested within blade extension 310 and blade extension 310 being nested in base blade 300). Blade extension 320 is extended or retracted along a guidance mechanism, possibly similar to the one used to guide blade extension 310.

Figure 3E:
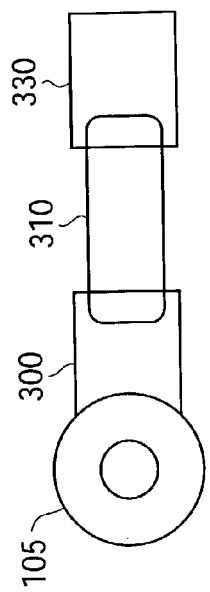

FIG. 3e shows an embodiment in which the blade is split into a base blade 300, a first blade extension 310 and a secondary blade extension 330. FIG. 3f shows the same blade arrangement with the blade extensions 310 and 330 retracted, such that blade extension 310 is nested partially in the base blade 300 and partly in the secondary blade 330.

Figure 3H:
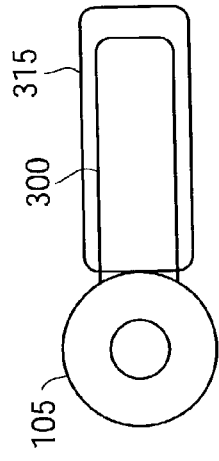
Figure 3J:
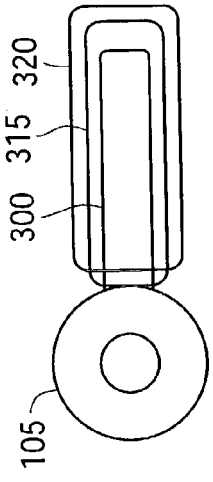
Figure 3L:
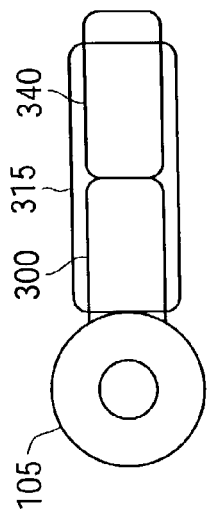
Figure 3G:
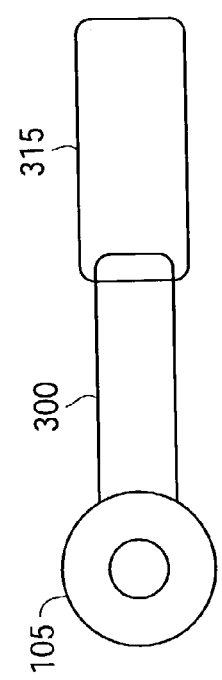
Figure 3I:
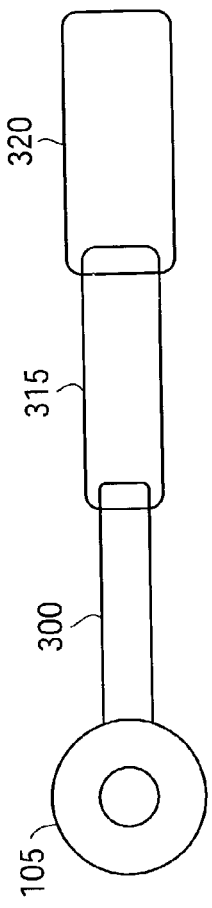

FIG. 3g shows an alternate embodiment in which blade extension 315, rather than the base blade 300, is the wider of the two blades. FIG. 3h shows the same design where blade extension is retracted. FIG. 3i shows an embodiment where the rotor blade includes three sections. FIG. 3j shows the blade in a fully retracted position.

Figure 3K:
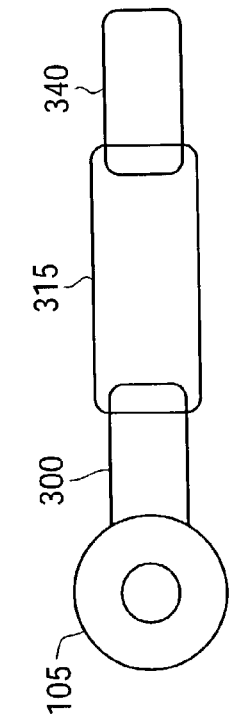

FIG. 3k shows base blade 300 attached to the center hub 105 being narrower than blade extension 315. A second blade extension 340 is attached to the opposite end of blade extension 315 from base blade 300. FIG. 3l shows both extensions retracted. In one embodiment, both the base blade 300 and extension 340 fit completely within blade extension 315 when fully retracted. In an alternative embodiment, each extension partially fits within blade extension 315.

FIG. 3m shows an alternate method of deployment for blade extension 310 from the base blade 300. A hinge 350 connects the extension 310 to base blade 300 at the end opposite of hub 105. Blade extension 310 jackknifes open in any one of a number of directions. FIG. 3n shows blade extension 310 in a closed, or "retracted" position. In one embodiment, blade extension 310 is spring-loaded for moving in the extended position. In an alternate embodiment, inertial force and friction blocks are used. A cable winch may be used to retract the blades during high winds. Alternatively the blade extension is spring loaded in the retracted position and cable, screw jacks, linkages and/or pistons may be used to extend blade extension 310.

FIG. 3o shows an embodiment in which blade extension 360 is inflatable or otherwise elastic. FIG. 3p shows blade extension 360 when deflated or otherwise deformed to minimum size. FIG. 3q illustrates an embodiment where inflatable or elastic blade extension 370 is between hub 105 and base blade 300. FIG. 3r shows this extension 370 deflated or deformed to minimum size. In one embodiment, the inflatable extension partially inflates or elastically grows depending on wind speed, pitch angle and other control factors.

Note that FIGS. 3a–3r only illustrate the rotor blades only in fully extended or fully retracted positions. However, in operation, the blade extensions may only be partially extended or retracted at times depending, in part, on wind conditions. To that extent, the blade extensions and base blades move relative to each other.

Figure 4:
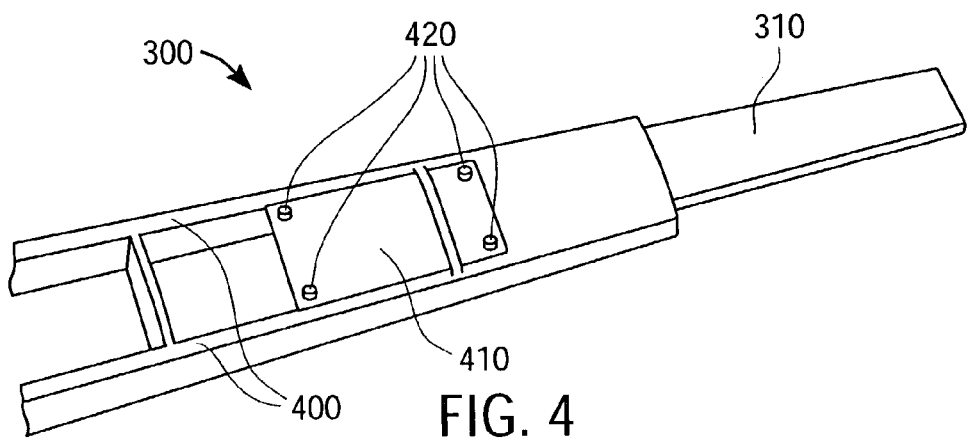
FIG. 4 illustrates one embodiment of a blade and sliding extension.

One embodiment of the slider track used to guide a blade extension between extended and fully retracted positions is illustrated in FIG. 4. Blade extension 310 is guided by one or more bearing tracks 400 in the interior of the base blade 300. This movement may be facilitated by the use of slider bearings. An extender root block 410 is attached to the end of blade extension 310 closest to the base blade 300. Bearing pads 420 are arranged around the extender root block 410 to facilitate movement on the bearing track 400. Two support spars straddling blade extension 310 replace internal center support spars that would be normally used to support the base blade. In one embodiment, the slider bearing may comprise glass-filled PTFE flat sheet material. In an alternate embodiment, anti-friction rolling element, hydrodynamic or hydrostatic bearings are used in place of the slider bearings.

In one additional embodiment, friction guide blocks may be used on the blade extensions 310 or friction pads at the ends of the base blades 300 to prevent slippage of blade extension 310. A set of replaceable seal strips (not shown) between the base blade 300 and blade extension 310 prevent wind, snow, and other debris from obstructing the rotor blade retracting or extending.

There are a number of options for a bearing track material and some exemplary materials are as follows:

a) glass/epoxy structural laminate within a directional surface laminate and no gel coat;

b) phenolic laminate (e.g., Tufnol) facings, which is non-corroding and will act as a failsafe bearing should the PTFE pad become excessively worn; and c) stainless steel facings, which works well with PTFE, is durable and relatively inexpensive.

Additional bearings within the tip of the base blade may be used to limit any undesirable motion of the extending portion of the blade relative to the base blade. Note that the base blade structure may have to be reinforced to handle the load associated with the sliding blade extension and the slider track.

Figure 5A:
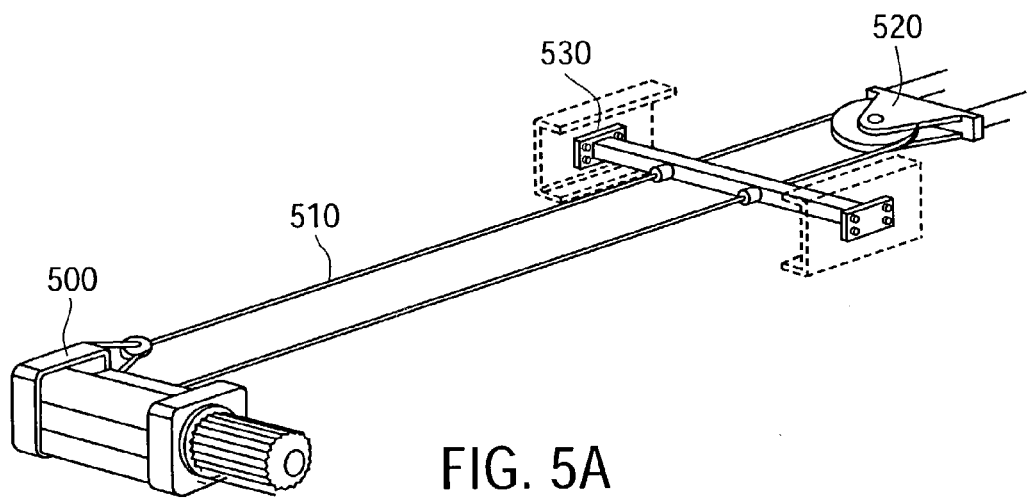
FIG. 5a illustrates one embodiment of a winch pulley extension system.

In one embodiment, a cable winch, as shown in FIG. 5a, is used for extending and retracting the extensions 310. A cable winch 500 is inserted into the blade base. The cable 510 (e.g., steel wire rope, braided non-metallic rope) is run through a pulley 520 attached to the end of the extender root block 410. Fixed guides are included for cable 510. A moving cross bar 530 supports the cable when the extender is fully extended. Cross bar 530 fastens between the base blade sheer webs to offer support and separation of the cable when the blade extension is deployed. The blade extension is extended using mechanical or inertial force. To keep the extension in place, friction pads may be used. In one embodiment, the winch is sized for the maximum load required to winch against the forces composed of the inertial forces and aerodynamic load at normal operational speeds and guide bearing friction. In one embodiment, the winch is anchored into the base blade on a fabricated frame.

In another embodiment, a cable system may be used in conjunction with one or more pulleys to cause the blade extension to extend as a cable is pulled towards the rotor hub. Furthermore, additional methods of extending and retracting the extension include, for example, but not limited to, a recirculating ball worm screw, a jacking screw, a pneumatic retraction and extension system, and a hydraulic retraction and extension system.

Figure 5B:
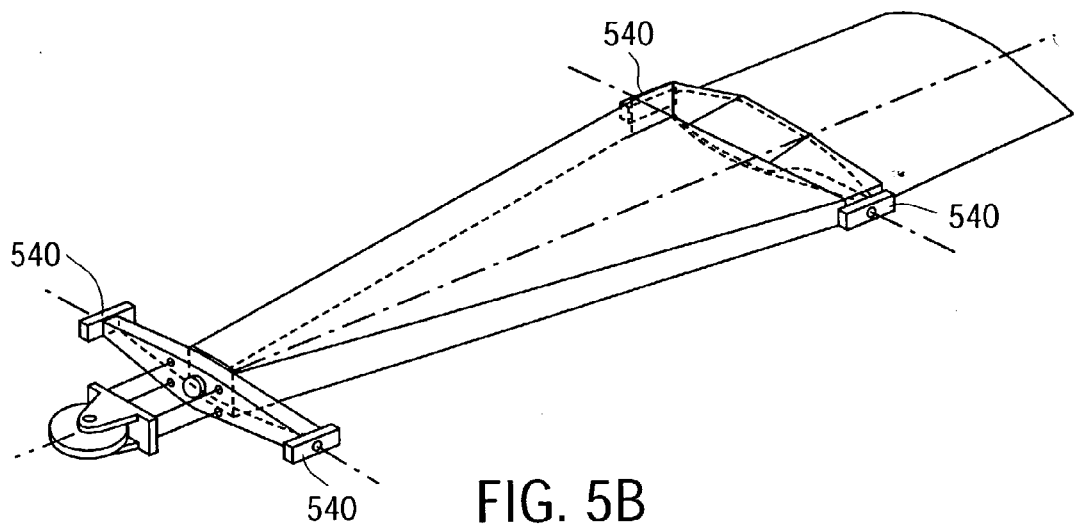
FIG. 5b illustrates one embodiment of an extender slide system.

FIG. 5b illustrates one embodiment of an extender slide system showing the root end of a blade extension. This may operate in conjunction with the cable winch system of FIG. 5a. Referring to FIG. 5b, the extender slide system includes pads 540 that help self-aligning holders carried on the blade extension. The mounting arrangements for the bearing pads permits self-aligning action both longitudinally and traversely.

Figure 6A:
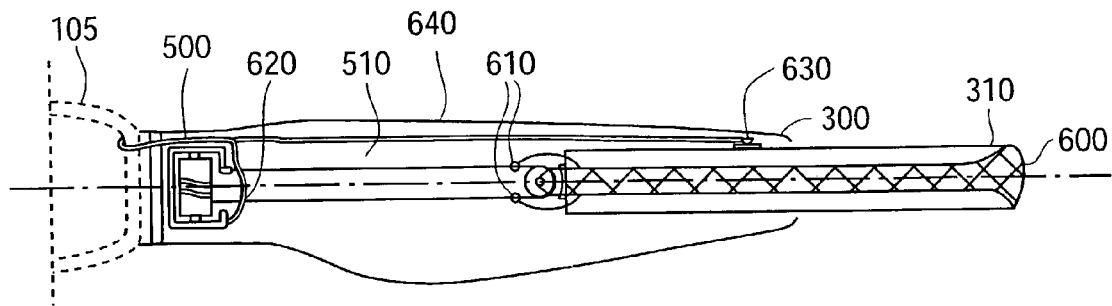
FIGS. 6a–6b illustrates different grounding mechanisms for blade extensions.

In one embodiment, the blade extensions can be grounded to protect against strikes by lightning, as shown in FIG. 6. FIG. 6a shows a spark gaps model of lightning protection. A conductive mesh 600 is laminated into the skin of the extension 310. The mesh on the extension 310 is connected to the steel wire pulley cable 510 by spark gaps 610. A second group of spark gaps 620 are placed at the cable winch 500 end of the cable 510 to provide an electrical connection to the hub casting 105. The base blade 300 is protected by a standard tip stud 630 and bonding conductor 640 through to the hub casting 105. In an alternate embodiment, the blade extension also has a tip stud and bonding conductor.

Figure 6B:
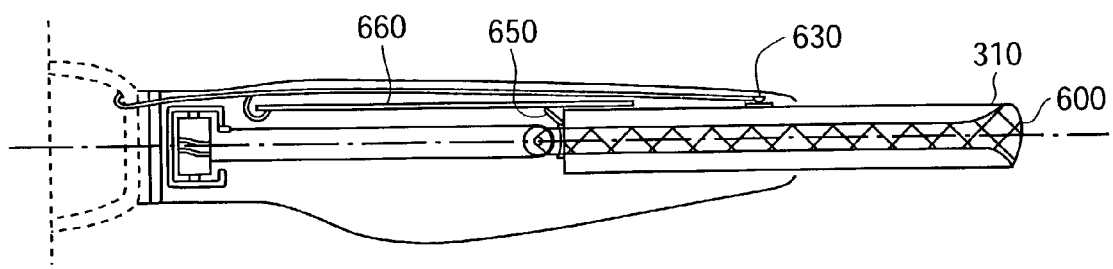

FIG. 6b shows an alternate embodiment of the grounding device for the extension. The blade extension 310 uses a conductive mesh 600 or tip stud and bonding conductor. Instead of the spark gaps, a sliding contact 650 is attached to the root base of the blade extension. The sliding contact 650 is in constant contact with either a conductive bus bar, a conductive bearing track 660, or some other device to allow connectivity with the hub.

Exemplary Power Curves

Figure 7A:
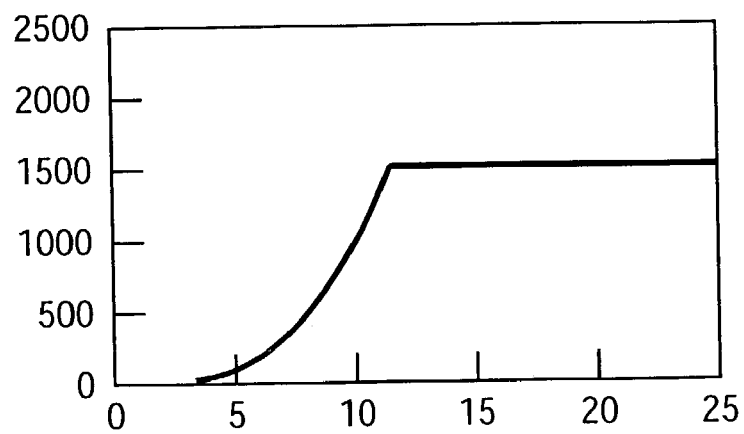
FIGS. 7a–7e illustrate exemplary power curves.
Figure 7B:
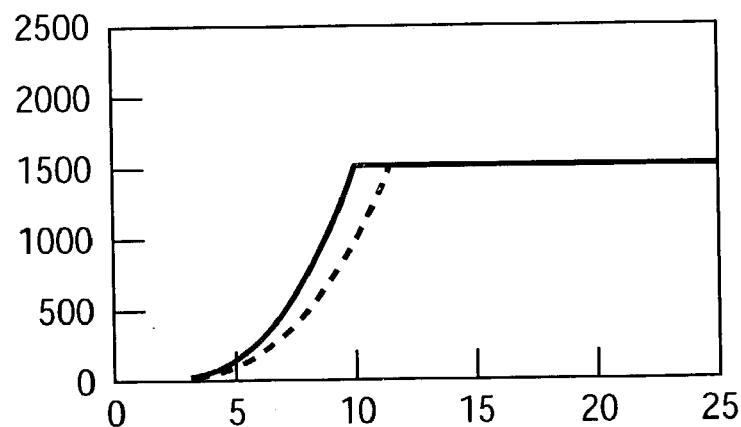

FIGS. 7a–7e show exemplary power curves. FIG. 7a is the normal power curve of a conventional baseline wind turbine with fixed diameter rotor. FIG. 7b illustrates a power curve that results from an increase in diameter for a turbine with one embodiment of a variable diameter rotor taking the variable diameter rotor up a steeper cubic curve in wind speeds below rated and achieving rated power in a lower wind speed. If the tip speed is the same as baseline at rated wind speed and the diameter is larger, the shaft speed must be less and the rated torque greater than baseline for the same power.

Figure 7C:
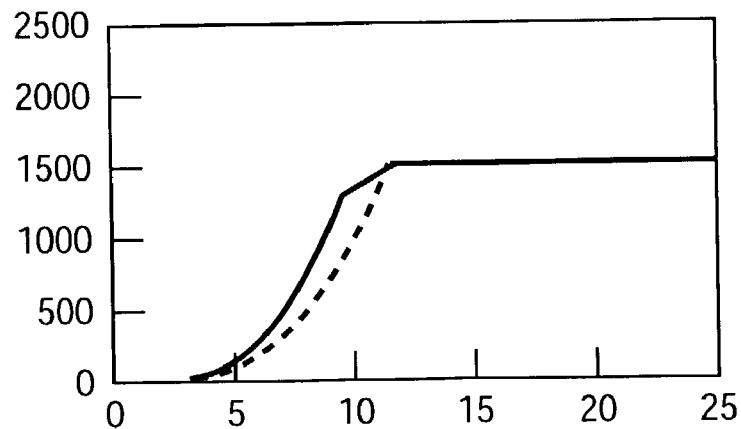

FIG. 7c is a power curve for a variable diameter rotor in which torque is not allowed to rise above baseline, a worthwhile restriction for a small energy loss. Referring to FIG. 7c, at the point of intersection of the curve with baseline, all the main parameters, torque, tip speed, power, wind speed are the same and so it follows that the variable diameter rotor will have contracted to the same diameter as the baseline.

Figure 7D:
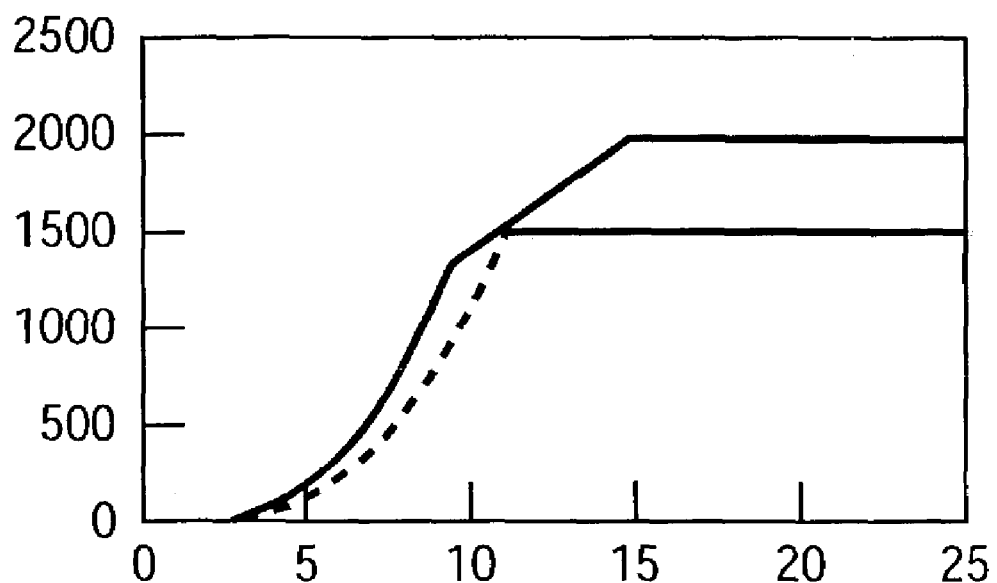
Figure 7E:
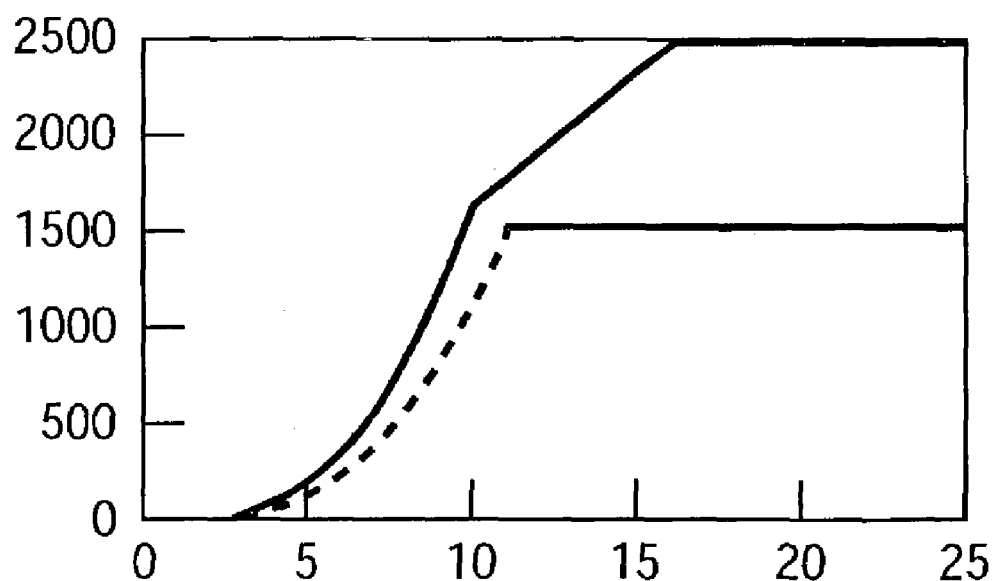

In one embodiment, the variable diameter rotor is capable however of further diameter contraction and, at constant tip speed, some further increase in rotor speed. This allows more power to be generated, as shown in FIG. 7d, without any increase in gearbox torque. Although the extra energy from this strategy arises from operation in rather high, less frequent wind speeds, it still represents an economic gain as only the turbine electrical system cost increases to accommodate this increased power level operating mode. An important feature of the power curve of the variable diameter rotor is the ability to maintain a high almost constant rotor efficiency in the diameter changing regime due to automatic matching of tip speed ratio and rotor solidity.

As to a relation between torque rating of the drive train and diameters for optimum economics, the key lies in the ability to regulate systems loads almost independent of torque up-rating. Results suggest that about a 30% up-rating in drive train torque (1.3 torque factor) is advantageous (at higher torque factors, the energy increases are diminished by the load regulation strategies). This leads to a power curve shown in FIG. 7e. The baseline is the curve with the x's on it.

Load Management

In contrast to conventional wind turbines, the variable diameter rotor may be operated with a relatively larger rotor diameter and higher power. Load regulation may be controlled using appropriate control of pitch system set points and diameter/speed variation. As torque factor increases, the rotor thrust increases. Even for small increases in torque factor, from 1 through 1.3 to 1.5 (at a 1° minimum pitch setting), the increase in rotor thrust may be substantial. To avoid an increase in rotor thrust when increases in torque factor are made, the minimum pitch angle may be increased. For example, the minimum pitch angle may be increased from a more normal 1° to 6° and 8° for torque factors of 1.3 and 1.5.

There is of course some energy penalty associated with increasing the minimum pitch angle. The energy yield increases almost linearly with torque factor in the absence of any load regulation. However, when the pitch setting is adjusted to regulate rotor thrust, the power curves converge at the higher torque factors. Up to a factor of approximately 1.3, there are substantial energy gains with each increment of torque factor, but thereafter little difference.

Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A wind turbine, comprising:
   a center hub;
   a plurality of aerofoil rotor blades arranged around the center hub, each aerofoil rotor blade being adjustable in length and being adjustable in pitch angle; and
   an electrical control system to control the length and pitch angle of the plurality of aerofoil rotor blades, the electrical control system to command the aerofoil rotor blades to a first pitch angle when the aerofoil rotor blades are at a maximum length, the electrical control system to command the aerofoil rotor blades to a second pitch angle greater than the first pitch angle if a threshold is exceeded, the electrical control system to command a reduction in length of the aerofoil rotor blades after the command to the second pitch angle.

2. The wind turbine of claim 1, wherein the first pitch angle is a minimum pitch angle for the plurality of aerofoil rotor blades.

3. The wind turbine of claim 1, wherein each of the plurality of airfoil rotor blades comprises:
   a first aerofoil rotor blade portion attached to the center hub; and
   a second aerofoil rotor blade portion, the second aerofoil blade portion being movable into and out of the first aerofoil rotor blade portion to adjust the length of the aerofoil rotor blade.

4. The wind turbine of claim 3, wherein the second aerofoil rotor blade portion is nested at least partially inside the first aerofoil rotor blade portion.

5. The wind turbine of claim 3, wherein the second aerofoil rotor blade portion is made of a carbon compound.

6. The wind turbine of claim 3, wherein the second aerofoil rotor blade portion is made of a glass epoxy.

7. The wind turbine of claim 3, wherein each aerofoil rotor blade includes one or more spark gaps to electrically connect the second aerofoil rotor blade portion to a cable system to expand and retract the aerofoil rotor blade.

8. The wind turbine of claim 7, wherein each of the plurality of aerofoil rotor blades includes one or more spark gaps to electrically connect the cable system to the center hub.

9. The wind turbine of claim 3, wherein each of the plurality of aerofoil rotor blades includes an electrically conductive track on the first aerofoil rotor blade portion and a sliding contact on the second aerofoil rotor blade portion to electrically connect the second aerofoil rotor blade portion to the electrically conductive track.

10. The wind turbine of claim 3, wherein each of the plurality of airfoil rotor blades further comprises a third aerofoil blade portion, the third aerofoil blade portion being movable to adjust the length of the aerofoil rotor blade.

11. The wind turbine of claim 10, wherein the second aerofoil blade portion is adjustable independently from the third aerofoil blade portion.

12. The wind turbine of claims 1, wherein the electrical control system further controls a yaw mechanism to control the direction of the wind turbine.

13. The wind turbine of claims 12, wherein the electrical control system further controls rotational speed of the wind turbine.

14. The wind turbine of claim 1, wherein the threshold is a maximum wind speed.

15. The wind turbine of claim 1, wherein the threshold is a maximum amount of power generated by the wind turbine.

16. A method comprising:
   extending a first aerofoil rotor blade of a plurality of aerofoil rotor blades of a wind turbine to a maximum length for the aerofoil rotor blade;
   adjusting a pitch angle of the first aerofoil rotor blade to a minimum pitch angle for the aerofoil rotor;
   detecting an indication to shorten the length of the first aerofoil rotor blade while the first aerofoil rotor blade is at the maximum length;
   in response to detecting the indication to shorten the length of the first aerofoil rotor blade, adjusting the pitch angle of the first aerofoil rotor blade to another pitch angle greater than the minimum pitch angle; and
   after commencing the adjustment of the pitch angle of the first aerofoil rotor blade, shortening the first aerofoil rotor blade to a length that is less than the maximum length.

17. The method of claim 16, wherein detecting the indication to shorten the length of the first aerofoil rotor blade comprises detecting a wind speed above a threshold.

18. The method of claim 16, wherein detecting the indication to shorten the length of the first aerofoil rotor blade comprises detecting a level of power generated by the wind turbine above a threshold.

19. The method of claim 16, wherein the first aerofoil rotor blade comprises a first section coupled with a center hub and a second section movably coupled with the first section, and wherein adjusting the length of the first aerofoil rotor blade comprises moving the second section towards or away from the center hub.

20. The method of claim 19, wherein the first aerofoil rotor blade further comprises a third section movably coupled with the second section, and wherein adjusting the length of the first aerofoil rotor blade further comprises moving the third section towards or away from the center hub.

21. The method of claim 20, wherein the second section and the third section are adjusted independently.

22. A wind turbine, comprising a variable diameter rotor having:
   a center hub;
   a first set of aerofoil rotor blades arranged around the center hub;
   a first set of aerofoil rotor blade extensions nested at least partially inside the first set of aerofoil rotor blades; and
   a second set of aerofoil rotor blade extensions nested at least partially in the first set of aerofoil rotor blades or the first set of aerofoil rotor blade extensions;
   wherein the first set of blade extensions and the second set of blade extensions are capable of extending an amount less than or equal to the length of the first set of blades by protracting from the first set of blades; wherein the first set of blades are attached to the center hub, the first set of blade extensions protracting from an end of the first set of blades opposite the hub, and the first set of blade extensions being nested at least partially in the second set of blade extensions; and wherein the second set of blade extensions are connected to the first set of blades by the first set of blade extensions such that, when the first set of blade extensions is retracted, the first set of blade extensions nest partially in the first set of blades and partially in the second set of blade extensions.

23. The wind turbine of claim 22, further comprising a first set of seal strips between the second set of blade extensions and the first set of blade extensions.

24. The wind turbine of claim 23, further including a second set of seal strips between the first set of blade extensions and the first set of blades.

25. A wind turbine, comprising a variable diameter rotor having:
- a center hub;
- a first set of aerofoil rotor blades arranged around the center hub;
- a first set of aerofoil rotor blade extensions nested at least partially inside the first set of aerofoil rotor blades; and
- a second set of aerofoil rotor blade extensions nested at least partially in the first set of aerofoil rotor blades or the first set of aerofoil rotor blade extensions;
- wherein the first set of blade extensions and the second set of blade extensions are capable of extending an amount less than or equal to the length of the first set of blades by protracting from the first set of blades; wherein the first set of blade extensions are attached to the center hub, with the first set of blade extensions protracting from an end of the first set of blades closest to the center hub; and wherein the second set of blade extensions are nested within the first set of blades at an end opposite the end that is attached to the first set of blade extensions, so that both sets of blade extensions, when completely retracted, are nested within the first set of blades.

26. The wind turbine of claim 25, wherein the second set of blade extensions are nested within the first set of blades at an end opposite the end that is attached to the first set of blade extensions, so that both sets of blade extensions, when completely retracted, are partially nested within the first set of blades.

\* \* \* \* \*